US012608669B2

(12) United States Patent
Matsumoto et al.

(10) Patent No.: US 12,608,669 B2
(45) Date of Patent: Apr. 21, 2026

(54) INFORMATION PROCESSING DEVICE FOR PRESENTING INFORMATION REGARDING A RISK OF PROVIDING DATA AND TRANSMITTING THE DATA AFTER CONSENT

(71) Applicant: TOYOTA JIDOSHA KABUSHIKI KAISHA, Toyota (JP)

(72) Inventors: Shigeki Matsumoto, Nagoya (JP); Naoya Oka, Nagakute (JP); Hidetaka Eguchi, Nagoya (JP); Shigeru Ichikawa, Nagoya (JP); Takeshi Yamada, Nagoya (JP); Masayo Nagai, Nagoya (JP); Ryosuke Yamamoto, Konan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 18/745,303

(22) Filed: Jun. 17, 2024

(65) Prior Publication Data

US 2025/0029041 A1      Jan. 23, 2025

(30) Foreign Application Priority Data

Jul. 21, 2023      (JP) ................................. 2023-118865

(51) Int. Cl.
*G06Q 10/0635*          (2023.01)

(52) U.S. Cl.
CPC ................................ *G06Q 10/0635* (2013.01)

(58) Field of Classification Search
CPC ......................................... G06Q 10/00–50/00
USPC .............................................. 705/7.11–7.42
See application file for complete search history.

(56) References Cited

U.S. PATENT DOCUMENTS

| | | | | |
|---|---|---|---|---|
| 7,801,747 | B2 * | 9/2010 | Califano | ................ G16H 10/60 434/350 |
| 10,956,586 | B2 * | 3/2021 | Sadeh | ................... H04L 67/306 |
| 11,538,287 | B2 * | 12/2022 | Fang | .................... G07C 5/0816 |
| 11,651,105 | B2 * | 5/2023 | Amico | ................ G06F 21/6227 726/26 |
| 12,112,586 | B2 * | 10/2024 | Cawse | ................... G07C 5/008 |
| 2006/0271406 | A1 * | 11/2006 | Califano | ................ G16H 10/40 705/3 |
| 2008/0119983 | A1 * | 5/2008 | Inbarajan | ............... G07C 5/008 701/123 |

(Continued)

FOREIGN PATENT DOCUMENTS

| | | |
|---|---|---|
| JP | 2015-141642 A | 8/2015 |
| JP | 2017-228255 A | 12/2017 |

(Continued)

OTHER PUBLICATIONS

Keith Barry; "How Driver Monitoring Systems Can Protect Drivers and Their Privacy" Consumer Reports; Feb. 17, 2022. Retrieved from https://www.consumerreports.org/electronics/privacy/driver-monitoring-systems-can-protect-drivers-and-privacy-a7714760430/ (Year: 2022).*

*Primary Examiner* — Alan S Miller
(74) *Attorney, Agent, or Firm* — Sughrue Mion, PLLC

(57) ABSTRACT

Information on a risk occurring when first data acquired during traveling by a first vehicle is provided to a first business is acquired, information on the risk is presented to a user associated with the first vehicle, and the user is asked whether to consent to provide the first data to the first business.

4 Claims, 6 Drawing Sheets

(56) References Cited

U.S. PATENT DOCUMENTS

| | | | |
|---|---|---|---|
| 2020/0294170 A1 | 9/2020 | Yamashima | |
| 2021/0192081 A1* | 6/2021 | Brannon | H04L 63/10 |
| 2021/0398159 A1 | 12/2021 | Nagasaka et al. | |
| 2022/0035947 A1* | 2/2022 | Amico | G06F 21/6245 |
| 2022/0129587 A1* | 4/2022 | Jones | G06F 21/6272 |
| 2022/0270177 A1* | 8/2022 | Chintakindi | H04W 4/029 |
| 2024/0135032 A1* | 4/2024 | Amico | G06F 18/2113 |

FOREIGN PATENT DOCUMENTS

| | | |
|---|---|---|
| JP | 2020-149254 A | 9/2020 |
| JP | 2021-195933 A | 12/2021 |

* cited by examiner

SERVER DEVICE 200

3. SEND DATA WITH DRIVER'S CONSENT

1. OBTAIN PRIOR CONSENT FOR PROVIDING DATA

2. IN-VEHICLE DEVICE GENERATES DATA

IN-VEHICLE DEVICE 100

VEHICLE 10

FIG. 3A

| DATA ID | DATA TYPE | DESTINATION | ACQUISITION CONDITIONS | TRANSMISSION CYCLE | ... | USING BUSINESS | PROFIT-RELATED DATA | RISK-RELATED DATA |
|---|---|---|---|---|---|---|---|---|
| ... | IMAGE DATA | MANAGEMENT SERVER 200 | RETRIEVE AT THE SPECIFIED POINT (···) | ONLY ONCE | ... | COMPANY X | ... | ... |
| ... | POSITION INFORMATION | MANAGEMENT SERVER 200 | IGNITION IN OPERATION | EVERY SECOND | ... | COMPANY Y | ... | ... |
| ... | PERSONAL INFORMATION | MANAGEMENT SERVER 200 | WHEN IGNITION IS TURNED ON | ONLY ONCE | ... | COMPANY Z | ... | ... |
| ... | | | | ... | ... | ... | ... | ... |

FIG. 3B

| DRIVERS ID | DATA ID | DESTINATION | AVAILABILITY | ... |
|---|---|---|---|---|
| D001 | ... | MANAGEMENT SERVER 200 | PERMISSION | ... |
| D001 | ... | MANAGEMENT SERVER 200 | REFUSAL | ... |
| ... | ... | ... | ... | ... |

FIG. 3C

| DRIVERS ID | DATE AND TIME OF ACQUISITION | ACQUISITION LOCATION | DATA ID | SENSOR DATA | ... |
|---|---|---|---|---|---|
| D001 | ... | ... | ... | (Binary) | ... |
| D001 | ... | ... | ... | (Binary) | ... |
| ... | ... | ... | ... | ... | ... |

FIG. 6A

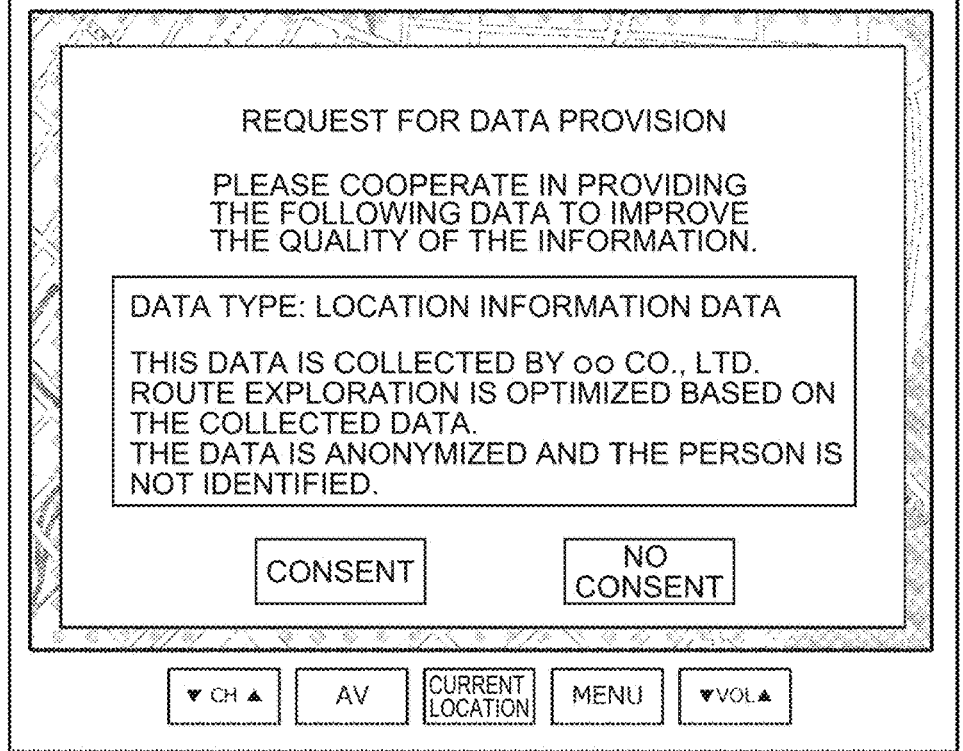

REQUEST FOR DATA PROVISION

PLEASE COOPERATE IN PROVIDING
THE FOLLOWING DATA TO IMPROVE
THE QUALITY OF THE INFORMATION.

DATA TYPE: LOCATION INFORMATION DATA

THIS DATA IS COLLECTED BY oo CO., LTD.
ROUTE EXPLORATION IS OPTIMIZED BASED ON
THE COLLECTED DATA.
THE DATA IS ANONYMIZED AND THE PERSON IS
NOT IDENTIFIED.

| CONSENT | NO CONSENT |

| ▼ CH ▲ | AV | CURRENT LOCATION | MENU | ▼VOL▲ |

FIG. 6B

■ RISK-RELATED INFORMATION ■

THE ACQUIRED DATA IS TRANSMITTED TO
THE EQUIPMENT MANAGED BY oo CO., LTD. AND
USED BY ×× CO., LTD.

THE DATA CONTAINS ONLY AGE, GENDER, AND
LOCATION INFORMATION, AND YOUR PRIVACY IS
NOT COMPROMISED.

FIG. 6C

■ PROFIT-RELATED INFORMATION ■

THE ACQUIRED DATA IS TRANSMITTED TO
THE EQUIPMENT MANAGED BY oo CO., LTD. AND
USED BY ×× CO., LTD.
THE PROVISION OF DATA IMPROVES THE ACCURACY
OF THE DRIVING ASSISTANCE FUNCTION, AND
REDUCES THE OCCURRENCE OF TRAFFIC ACCIDENTS
IN THE REGION.
IN ADDITION, WE WILL OFFER oo POINTS OF
ELECTRONIC MONEY TO CUSTOMERS WHO HAVE
CONSENTED TO PROVIDE DATA BY oo MONTH.

INFORMATION PROCESSING DEVICE FOR PRESENTING INFORMATION REGARDING A RISK OF PROVIDING DATA AND TRANSMITTING THE DATA AFTER CONSENT

CROSS-REFERENCE TO RELATED APPLICATION

This application claims priority to Japanese Patent Application No. 2023-118865 filed on Jul. 21, 2023 incorporated herein by reference in its entirety.

BACKGROUND

1. Technical Field

The present disclosure relates to technology for collecting information from vehicles.

2. Description of Related Art

In recent years, there has been a demand for appropriate management of personal information. In this regard, Japanese Unexamined Patent Application Publication No. 2017-228255 (JP 2017-228255 A), for example, discloses an evaluation device that is capable of calculating a risk of an individual being identified in a system that anonymizes personal information and performs external providing thereof.

SUMMARY

It is an object of the present disclosure to appropriately guide a provider of information with regard to information collection.

One aspect of an embodiment of the present disclosure is an information processing device, including a control unit that executes acquiring information regarding a risk involved when providing first data that is data acquired by a first vehicle while traveling, to a first business, presenting information regarding the risk to a user associated with the first vehicle, and querying the user whether the user consents to providing the first data to the first business.

Also, other aspects include a method that is executed by the above device, a program for causing a computer to execute the method, and a computer-readable storage medium storing the program in a non-transitory manner.

According to the present disclosure, a provider of information can be appropriately guided regarding information collection.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3A shows an example of the data stored in the on-board equipment and the server equipment;

FIG. 3B shows an example of the data stored in the on-board equipment and the server equipment;

FIG. 3C shows an example of the data stored in the on-board equipment and the server equipment;

FIG. 6A is an example of a window for inquiring the consent to data provision;

FIG. 6B is an exemplary window for querying the consent to the data provision; and FIG. 6C shows an example of a display for inquiring about consent to the data-providing.

DETAILED DESCRIPTION OF EMBODIMENTS

Figure 1:
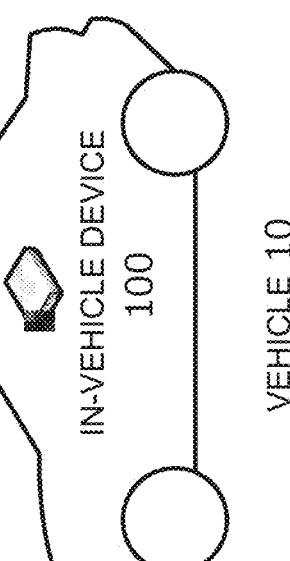
FIG. 1 is a schematic diagram of a vehicle system according to a first embodiment.

In recent years, attempts have been made to use data collected from automobiles. It is expected that various services can be provided by using data collected from vehicles as big data. On the other hand, the data transmitted from the vehicle may include personal information and personal information. Such data may cause privacy problems by linking with individuals, such as location information, as well as personal information itself.

For this reason, an attempt has been made to conclude a data provision contract with a user (for example, a driver of a vehicle) after having explained in advance the collection and use of data. However, when a data provision contract is concluded, it is not widely performed to explain what kind of effect occurs to a user by providing the data, and it is a cause to hesitate to provide the data. An information processing device according to the present disclosure solves such a problem.

An information processing device according to a first aspect of the present disclosure includes a control unit that executes: acquiring information on a risk occurring when first data acquired during traveling by a first vehicle is provided to a first business; presenting information on the risk to a user associated with the first vehicle; and inquiring the user whether or not to consent to provide the first data to the first business.

The first data is data acquired while the first vehicle is traveling, and includes personal information of the driver and data related to the traveling of the first vehicle (for example, position information, speed information, and the like). The first data is also referred to as sensor data. The control unit acquires information on a risk generated by providing the first data to the first business. The first business is a business that provides a predetermined service by using the first data. In addition, the information on the risk may explain specific damage that may occur, such as "an event assumed when information is leaked", or may explain other than damage, such as "personal information is grasped by any business". For this reason, the control unit may acquire information related to risk, which is defined in advance, and perform guidance to the user based on the information. The user associated with the first vehicle is typically a driver of the first vehicle, but the user associated with the first vehicle may be a passenger, an owner of the first vehicle, or the like.

When the first data is of a plurality of types, the control unit may acquire and present information related to the risk for each type of the first data. In this case, the user may be allowed to select the type of the first data to be provided to the first business.

In addition, the control unit may further present the acquisition condition of the first data by the first vehicle to the user when acquiring the consent. According to such a configuration, it is possible to allow the user to grasp under what conditions the first data is acquired.

In addition, the control unit may further present data regarding a ratio of the user who has consented to provide the first data to the whole. For example, if there are multiple users under the control of the system, a percentage of the total consents to providing the data may be presented.

Hereinafter, embodiments of the present disclosure will be described with reference to the drawings. A hardware configuration, a module configuration, a functional configuration, etc., described in each embodiment are not intended to limit the technical scope of the disclosure to them only unless otherwise stated.

First Embodiment

An outline of a vehicle system according to a first embodiment will be described with reference to FIG. 1. The vehicle system according to the present embodiment includes the vehicle 10 on which the in-vehicle device 100 is mounted and the server device 200. A plurality of vehicles 10 (in-vehicle devices 100) may be included in the system.

The vehicle 10 is a probe vehicle for collecting data. The vehicle 10 is configured to be able to collect data related to traveling and data related to an occupant, and can transmit the collected data to the server device 200 via the in-vehicle device 100. Examples of the traveling data include vehicle speed, traveling direction, position information, information on driving operation, information on vehicle behavior, and image data captured by an in-vehicle camera. Further, as the data related to the occupant, for example, an identifier, a gender, an age, or the like of an individual can be exemplified. In the following description, the data collected by the vehicle 10 is referred to as sensor data. Although the sensor data is an example of "first data", the data collected by the vehicle 10 is not necessarily obtained by sensing.

The server device 200 is a device that provides a predetermined service based on sensor data collected from the vehicle 10. For example, by collecting position information and speed information from a plurality of vehicles 10, traffic information and traffic information can be generated and provided to other vehicles. In addition, by collecting data related to the occupant of the vehicle, it is possible to provide information suitable for an individual. In addition, it is possible to generate road map data by collecting images captured by the in-vehicle camera. The server device 200 requests the plurality of vehicles 10 to transmit predetermined sensor data, and the vehicle 10 (the in-vehicle device 100) transmits the sensor data in response thereto.

The server device 200 may be a device that provides a service to the vehicle 10 (or another vehicle) based on sensor data collected from the vehicle 10, or may be a device that relays sensor data collected from the vehicle 10 to a further external device. For example, when there is a plurality of types of sensor data collected from the vehicle 10, the server device 200 may relay the sensor data to different external devices under the management of different businesses for each type of sensor data.

The server device 200 also obtains a consent to provide sensor data (i.e., to transmit sensor data to the server device 200) from a user (e.g., a driver) associated with the vehicle 10. The presence or absence of consent is stored in both the server device 200 and the in-vehicle device 100, and the in-vehicle device 100 transmits data to the server device 200 only when there is consent to provide data. The in-vehicle device 100 has a database that stores the presence or absence of consent for each type of sensor data, and determines whether or not there is a user's consent to transmitting a certain sensor data (whether or not the user has consented to the past) based on the database.

In the vehicle system according to the present embodiment, the plurality of in-vehicle devices 100 and the server device 200 are connected to each other via a network. The network may be, for example, a worldwide public communication network such as the Internet or the like, or a wide area network (WAN) or another communication network. The network may also include telephone communication networks for cellular phones and the like, and wireless communication networks such as Wi-Fi (registered trademark).

Figure 2:
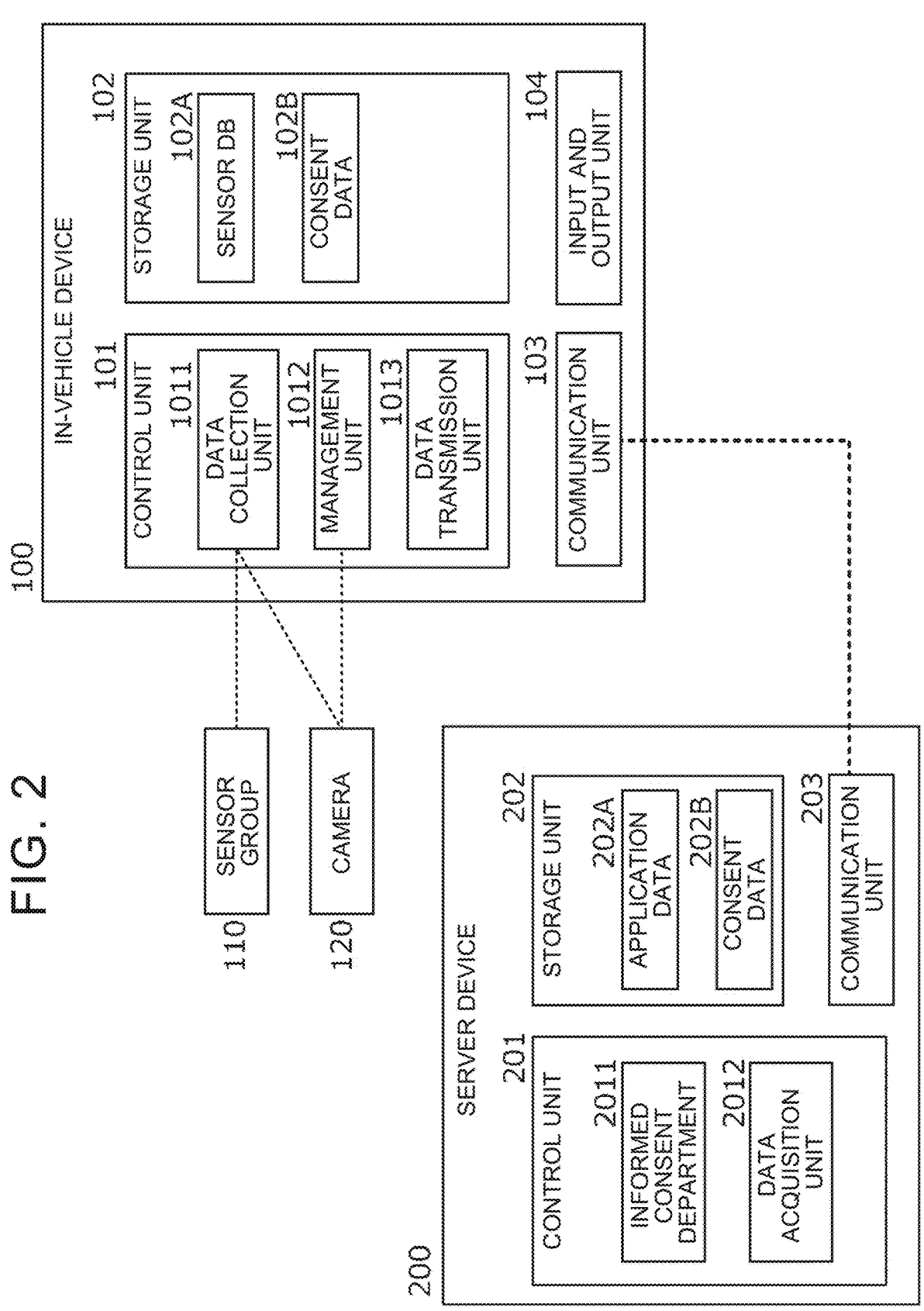
FIG. 2 is a diagram illustrating components of an in-vehicle device and a server device.

Each element of the system will be described. FIG. 2 is a diagram illustrating a system configuration of the in-vehicle device 100 and the server device 200.

First, a configuration of the server device 200 will be described. The server device 200 can be configured as a computer having a processor such as a CPU or a GPU, a main storage device such as a RAM or a ROM, an auxiliary storage device such as an EPROM, a hard disk drive, and a removable medium. An operating system (OS), various programs, various tables, and the like are stored in the auxiliary storage device. The programs stored in the auxiliary storage device are executed such that various functions can be implemented that match the predetermined purpose, which will be described below. However, some or all of the functions may be implemented by a hardware circuit such as an ASIC or an FPGA. Note that the server device 200 may be configured by a single computer or may be configured by a plurality of computers that cooperate with each other.

The server device 200 includes a control unit 201, a storage unit 202, and a communication unit 203.

The control unit 201 is an arithmetic device that governs the control performed by the server device 200. The control unit 201 can be realized by an arithmetic processing device such as a CPU. The control unit 201 includes two functional modules, a consent acquisition unit 2011 and a data acquisition unit 2012. The function modules may each be implemented by executing programs, stored in the auxiliary storage unit, on the CPU.

Prior to the acquisition of the sensor data from the vehicle 10, the consent acquisition unit 2011 acquires the consent to the data provision from the user of the vehicle 10. The server device 200 is configured to be able to acquire or store data related to the use of the sensor data to be acquired (hereinafter, application data). The application data includes, in addition to the application of the sensor data, data related to a transmission destination of the sensor data, an acquisition condition of the sensor data, a transmission timing of the sensor data, an entity (business) using the sensor data, and the like. The consent acquisition unit 2011 presents these to the user of the vehicle 10 via the in-vehicle device 100.

Also, the application data includes data related to risks generated by providing the sensor data. The consent acquisition unit 2011 presents the user of the vehicle 10 with an explanation regarding the risk or the like via the in-vehicle device 100. Further, the application data includes data related to the benefits generated by providing the sensor data. The consent acquisition unit 2011 presents, via the in-vehicle device 100, a user of the vehicle 10 with an explanation regarding the profit.

Based on the response from the user of the vehicle 10, the consent acquisition unit 2011 determines whether or not there is a consent to the data provision for each type of sensor data. In addition, the consent acquisition unit 2011 causes both the server device 200 and the in-vehicle device

100 to store the presence or absence of the consent when the consent for providing is obtained with respect to the sensor data of the specific type. When there is a plurality of sensor data to be provided, or when there is a plurality of businesses using the sensor data, a comprehensive consent may be obtained, or a plurality of consents may be obtained. It is to be noted that the user of the vehicle 10 consents to provide the data, and thus it can be regarded that a data provision contract is established between the user and the business who receives the provision of the sensor data.

The data acquisition unit 2012 requests each of the plurality of vehicles 10 (the in-vehicle device 100) to transmit the sensor data. For example, when the server device 200 executes a service for generating road map data based on an image captured by the vehicle 10, the server device 200 requests the vehicle 10 to transmit the image data. The type of sensor data requested by the server device 200 may vary depending on the service executed by the server device 200. In addition, the data acquisition unit 2012 receives sensor data from the plurality of vehicles 10 (in-vehicle devices 100) and stores the sensor data in the storage unit 202. The stored sensor data is used to provide a predetermined service.

The storage unit 202 includes a main storage device and an auxiliary storage device. The main storage device is a memory in which a program executed by the control unit 201 and data used by the control program are expanded. The auxiliary storage device is a device in which a program executed by the control unit 201 and data used by the control program are stored. The storage unit 202 stores sensor data collected from the vehicle 10.

In addition, the storage unit 202 stores the above-described use data. FIG. 3A is an exemplary application-data 202A. The application data is data related to handling of sensor data, and includes information related to an identifier (data ID) of sensor data, a type of sensor data, a transmission destination of sensor data, an acquisition condition of sensor data, a transmission period of sensor data, a business using sensor data, and the like. The transmission destination of the sensor data may be represented by a network address or the like. Examples of the acquisition condition of the sensor data include "an image is captured at a specific point", "a moving image is captured in a specific section", and "position information is acquired every second in a specific time zone".

Further, the application data includes data (risk-related data) for guiding the user to the risk generated by providing the sensor data. The risk-related data may include, for example, the following information.

What information is collected by which businesses?
What impact does the information have on the user as a result of the collection?
What kind of data is known to third parties in the event that information is leaked?
Is there a risk of misuse of data identified by third parties? The risk-related data may include an explanation of an event that does not normally occur, such as information leakage, or may include an explanation of an event that occurs in normal operation. The event of interest may be any event that the user considers to be a risk.

Further, the application data includes data (profit-related data) for guiding a user with a profit generated by providing the sensor data. The profit-related data may include, for example, the following information.

What information is collected by which businesses?
What benefits do users have as a result of the collection of information by the business?

What merits occur outside the user as a result of the information being collected by the business?
Consideration (incentive) for information collection, if any, content (amount, etc.)
Note that the benefits generated by providing the sensor data may include benefits other than direct benefits to the user. For example, a benefit generated by providing sensor data may be a benefit to the public, such as "providing image data improves security in an area where a vehicle is traveling" or "providing location information improves accuracy of traffic jam prediction". Benefits generated by providing sensor data may also relate to benefits that may be obtained by a business utilizing the sensor data.

In addition, the storage unit 202 stores data (hereinafter referred to as consent data) for managing the user's consent to the provision of the sensor data. Here, the consent data will be described. The consent data is data for recording whether or not transmission of the sensor data to the outside is permitted for each type of the driver, the transmission destination, and the sensor data. The consent data may be generated, for example, based on a result of an interaction with the driver.

FIG. 3B is an exemplary consent-data 202B. As shown in the figure, the consent data includes fields of driver ID, data ID, destination, and availability. The driver ID field stores an identifier that uniquely identifies the driver. In the data ID field, information for identifying the type of sensor data is stored. The transmission destination field stores information for identifying a transmission destination of the sensor data. In the provision availability field, the presence or absence of consent ("permission" or "rejection") regarding the provision of the sensor data is stored.

The communication unit 203 is a communication interface for connecting the server device 200 to a network. The communication unit 203 includes, for example, a network interface board and a wireless communication circuit for wireless communication.

Next, the in-vehicle device 100 will be described. The vehicle 10 is a connected car having a function of communicating with an external network. The vehicle 10 is equipped with an in-vehicle device 100.

The in-vehicle device 100 is a computer for collecting information. In the present embodiment, the in-vehicle device 100 includes a plurality of sensors for collecting information related to traveling of the vehicle 10, and transmits the collected sensor data to the server device 200 at a predetermined timing. The in-vehicle device 100 may be a device (for example, a car navigation device or the like) that provides information to an occupant of the vehicle 10, or may be an electronic control unit (ECU) included in the vehicle 10. In addition, the in-vehicle device 100 may be a data communication module (DCM) having a communication function.

The in-vehicle device 100 can be configured as a computer including a processor such as a CPU and a GPU, a main storage device such as a RAM and a ROM, and an auxiliary storage device such as a EPROM, a hard disk drive, and a removable medium. An operating system (OS), various programs, various tables, and the like are stored in the auxiliary storage device. The programs stored in the auxiliary storage device are executed such that various functions can be implemented that match the predetermined purpose, which will be described below. However, some or all of the functions may be implemented by a hardware circuit such as an ASIC or an FPGA.

The in-vehicle device 100 includes a control unit 101, a storage unit 102, a communication unit 103, and an input/ output unit 104. The in-vehicle device 100 is connected to the sensor group 110 and the camera 120.

The control unit 101 is an arithmetic unit that realizes various functions of the in-vehicle device 100 by executing a predetermined program. The control unit 101 may be implemented by, for example, a CPU. The control unit 101 includes a data collection unit 1011, a management unit 1012, and a data transmission unit 1013 as functional modules. Each functional module may be implemented by execution of a stored program by the CPU.

The data collection unit 1011 acquires sensor data from one or more sensors included in the sensor group 110 at predetermined timings, and stores the sensor data in the sensor DB 102A of the storage unit 102. When a plurality of pieces of sensor data can be acquired, the data collection unit 1011 may acquire all of the sensor data. The sensor DB 102A is a data base in which sensor data collected from sensors included in the vehicles 10 is stored. Further, the data collection unit 1011 may acquire image data via the camera 120 which is an image sensor, and store the acquired image data in the sensor DB 102A.

FIG. 3C is exemplary of data stored in the sensor DB 102A. The sensor DB 102A stores, in addition to the sensor data, an identifier of the driver, a date and time when the sensor data is acquired, a location (position information) where the sensor data is acquired, and an ID of the sensor data.

The management unit 1012 determines the sensor data stored in the sensor DB 102A to be transmitted to the server device 200 based on the consent obtained from the driver. Specifically, the management unit 1012 executes the following processing.

(1) Process of Receiving Application Data from Server Device 200

The server device 200 transmits the above-described application data to the in-vehicle device 100, thereby requesting the vehicle 10 for data. In other words, the application data also functions as data for requesting the vehicle 10 to transmit specific sensor data. As described above, the application data includes an identifier (data ID) of the sensor data, a type (data type) of the sensor data, a transmission destination of the sensor data, an acquisition condition of the sensor data, a transmission cycle of the sensor data, and the like. The application data may include information for describing an application of the sensor data, a business using the sensor data, a risk, a profit, and the like. The use data transmitted from the server device 200 is stored in the storage unit 102.

(2) Process of Managing Consent from User to Externally Transmit Sensor Data

External transmission refers to transmitting sensor data to a device (e.g., server device 200) external to vehicle 10 (i.e., providing sensor data externally). The management unit 1012 acquires, from the driver, the presence or absence of the provision consent for the specific sensor data included in the application data received from the server device 200, and generates the aforementioned consent data. The consent data is stored in the storage unit 102 (consent data 102B) and also transmitted to the server device 200 and also stored in the storage unit 202 (consent data 202B). The management unit 1012 determines whether or not the sensor data requested by the server device 200 can be transmitted based on the consent data and the detection result of the driver.

(3) Processing for Identifying Sensor Data that is Requested by Server Device 200 and has been Granted Permission for External Transmission Based on the consent data and the application data, the management unit 1012 determines whether or not transmission to the outside is permitted for the requested sensor data. When transmission to the outside is permitted, the management unit 1012 determines the sensor data as a transmission target.

For example, the management unit 1012 determines that the in-vehicle device 100 has the sensor data designated by the request data. The management unit 1012 recognizes which type of sensor data is requested by referring to the data ID included in the requested data. In addition, the management unit 1012 determines whether or not the in-vehicle device 100 has the matching sensor data by comparing the acquisition condition included in the requested data with the record recorded in the sensor DB 102A.

When the in-vehicle device 100 holds the sensor data designated by the request data and the provision of the sensor data is consented, the management unit 1012 determines the sensor data as a transmission target. When there is no history in which the driver of the vehicle 10 has permitted the external transmission of the target sensor data, the management unit 1012 may inquire the driver of the vehicle 10 about whether or not the transmission is permitted, and update the consent data based on the result.

The data transmission unit 1013 acquires the sensor data determined by the management unit 1012 from the storage unit 102 and transmits the sensor data to the server device 200.

The storage unit 102 is a memory device including a main storage device and an auxiliary storage device. An operating system (OS), various programs, various tables, and the like are stored in the auxiliary storage device. The programs stored in the auxiliary storage device are loaded into the work area of the main storage device and executed, and through this execution, various functions can be implemented that match the predetermined purpose, which will be described later. The main storage device may include random access memory (RAM) or read only memory (ROM). The secondary storage device may include Erasable Programmable ROM (EPROM) or Hard Disk Drive (HDD). Further, the auxiliary storage device may include a removable medium, that is, a portable recording medium.

The communication unit 103 is a wireless communication interface for connecting the in-vehicle device 100 to a network. The communication unit 103 is configured to be able to communicate with the server device 200 according to a communication standard such as a mobile communication network or a radio LAN, Bluetooth (registered trademark).

The input/output unit 104 is a unit that receives an input operation performed by a user of the device and presents information. In the present embodiment, a single touch panel display is used. That is, the device includes a liquid crystal display, a control unit thereof, a touch panel, and a control unit thereof.

The sensor group 110 is a set of a plurality of sensors included in the vehicle 10. The plurality of sensors may obtain data regarding travel of the vehicle, such as, for example, velocity sensors, accelerometers, and GPS modules. Further, the plurality of sensors may acquire data related to the traveling environment of the vehicle 10, such as an image sensor, an illuminance sensor, and a rainfall sensor. The sensor group 110 may include a sensor for collecting data related to a driver or an occupant of the vehicle 10. For example, an occupant of the vehicle may be identified based on an image obtained by capturing an inside of the vehicle, and data related to the occupant may be transmitted as sensor data.

The camera 120 includes a first camera mounted facing the outside of the vehicle, and a second camera mounted at a position where a face of an occupant seated in the driver's seat can be captured. The first camera functions as an image sensor that acquires an image, and the second camera is used to identify a driver of the vehicle 10 based on the face image. The image acquired by the first camera is also an example of sensor data.

The configuration shown in FIG. 2 is an example, and all or a part of the functions shown in FIG. 2 may be executed using a specially designed circuit. Further, a program may be stored or executed by a combination of the main storage device and the auxiliary storage device other than the functions shown in FIG. 2.

Figure 4:
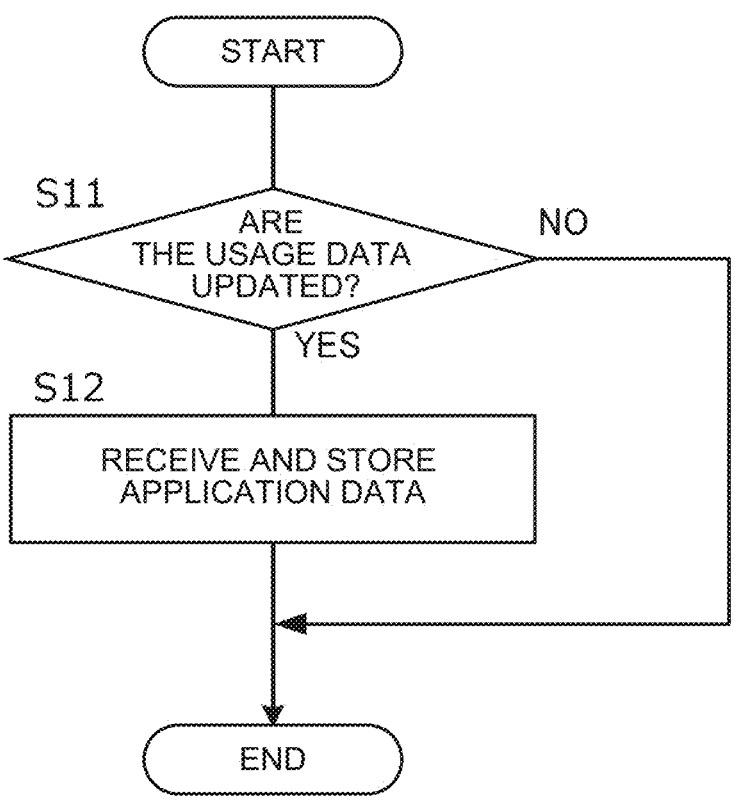
FIG. 4 is a flowchart of processing executed by the in-vehicle device.
Figure 5:
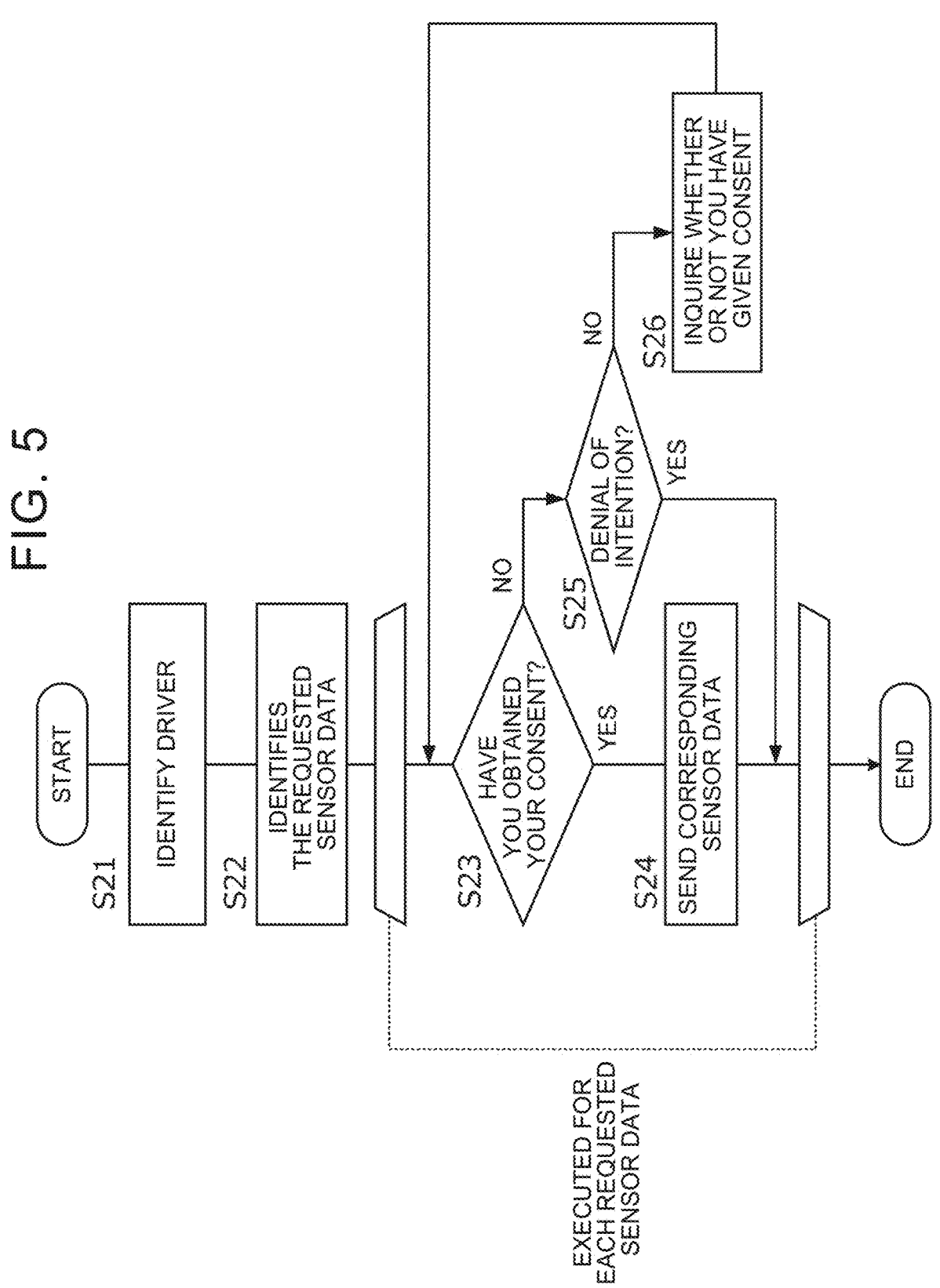
FIG. 5 is a flowchart of processing executed by the in-vehicle device.

Next, details of a process executed by the in-vehicle device 100 will be described. FIG. 4 and FIG. 5 are flowcharts of processing executed by the in-vehicle device 100.

In parallel with the execution of the illustrated flow chart, the data collection unit 1011 periodically acquires sensor data from the sensor (or the first camera) included in the sensor group 110, and executes a process of storing the sensor data in the sensor DB 102A of the storage unit 102.

The management unit 1012 executes a process of receiving the application data from the server device 200 and a process of transmitting the sensor data based on the received application data. FIG. 4 is a flowchart of processing performed by the in-vehicle device 100 to receive application data from the server device 200. The illustrated processing is executed at a predetermined timing (for example, at a timing at which the traveling system of the vehicle is started).

First, in S11, the management unit 1012 makes an inquiry to the server device 200 to determine whether there is any application data to be received. Whether or not there is application data to be received can be determined based on, for example, the last update date and time or the version number of the application data. Therefore, the server device 200 may notify the in-vehicle device 100 of the last update date and time and the version number of the application data. In addition, the in-vehicle device 100 may store these in the storage unit 102. If there is an application to be received, the process transitions to S12. In S12, the management unit 1012 receives the application data from the server device 200 and stores the application data in the storage unit 102. At this time, the old use data may be deleted.

FIG. 5 is a flowchart of processing performed by the in-vehicle device 100 to transmit sensor data to the server device 200 based on the use data. The illustrated processing is executed periodically while the vehicle 10 is traveling. First, in S21, the management unit 1012 acquires a face image of the driver via the camera 120 (second camera), and identifies the driver based on the face image. The identification of the driver can be performed, for example, by comparing the feature amount obtained by converting the face image with the feature amount corresponding to one or more drivers stored in advance. In S22, the management unit 1012 identifies the sensor data requested by the server device 200 based on the application data. In this step, the sensor data requested by the server device 200 and stored in the storage unit 102 is specified. The sensor data specified in this step may be of a plurality of types.

Processing of S26 from S23 is performed for each of the plurality of sensor data identified in S22. First, in S23, the management unit 1012 determines whether or not the driver's consent has been obtained for transmitting the target sensor data to the server device 200. For example, if there is a record in the consent data 102B in which the data ID matches the destination and there is a record in which the provision availability field is "permitted", this step is an affirmative determination. The negative determination in this step is made when the provision availability field is "rejected" or when the corresponding record does not exist (when the driver does not make an intention indication regarding external transmission with respect to the target sensor data).

When an affirmative determination is made on S23, the process transitions to S24, and the data transmission unit 1013 transmits the corresponding sensor data.

If a negative determination is made on S23, the process proceeds to S25. In S25, the management unit 1012 determines whether or not the driver has previously indicated the intention of refusal to transmit the sensor data having the corresponding data ID. For example, if there is a record in the consent data 102B in which the data ID matches the destination and there is a record in which the provision availability field is "rejected", this step is an affirmative determination. When an affirmative determination is made in S25, the sensor data is not transmitted.

When a negative determination is made in S25, the sensor data of the corresponding data ID indicates that the driver has not previously indicated the intention. The process then transitions to S26 and asks the driver for consent. In S26, the management unit 1012 checks with the driver whether or not the corresponding types of sensor data may be transmitted via the input/output unit 104. The checking may be performed via a screen such as FIG. 6A, for example. The screen may include information on a type of sensor data, an application, a transmission destination, an acquisition condition, a business using the sensor data, and a risk or benefit generated by providing the sensor data.

For example, a GUI component for guiding a risk or a benefit may be arranged on the screen, and the content of the specific risk and the benefit may be guided based on the manipulation of the user. FIG. 6B is an example of a screen for guiding information related to risks, and FIG. 6C is an example of a screen for guiding information related to profits. These screens can be generated based on information included in the application data. In a case where there is a plurality of types of sensor data to be transmitted, the consent may be obtained on a plurality of screens, or the user may be allowed to select whether or not to consent to provide the sensor data on the same screen.

When the driver answers, the outcome is reflected in the consent data 102B and the consent data 202B. Further, S23 and S24 processes are repeated based on the content.

As described above, according to the first embodiment, for each sensor data transmitted from the vehicle 10 to the server device 200 and for each driver, data regarding the presence or absence of consent for data transmission is accumulated in the in-vehicle device 100. In addition, the in-vehicle device 100 controls transmission of data to the server device 200 based on the data.

In addition, the in-vehicle device 100 presents information that specifically guides risks and benefits generated by providing data when requesting the driver for consent to provide data. As a result, the driver can recognize risks and benefits caused by the provision of data, and can make an appropriate judgment.

Second Embodiment

In the first embodiment, the in-vehicle device 100 provides the use of the sensor data, the business who uses the sensor data, the description regarding the risk and the profit, and the like based on the use data received from the server device 200. On the other hand, it is also possible to include other statistical information in the application data and provide the information in S26.

For example, the server device 200 may calculate a value such as "how many users of the whole consent to provide data" for each data ID based on the consent data acquired from the plurality of managed vehicles 10 (in-vehicle devices 100). Further, the calculated value may be included in the application data.

In this case, when inquiring the driver whether or not to consent to provide the data in S26, the in-vehicle device 100 (the management unit 1012) may notify the driver of "what percentage of the entire user consents to provide the data" on, for example, the screen illustrated in FIG. 6A, and ask the driver for the determination. In the present embodiment, the ratio of the user who has consented to the data provision to the whole is guided, but other information may be guided as long as it relates to the tendency of the consent in the whole.

Modified Examples

The above-described embodiments are merely examples, and the present disclosure may be appropriately modified and implemented without departing from the scope thereof. For example, the processes and means described in the present disclosure can be freely combined and implemented as long as no technical contradiction occurs.

In the first and second embodiments, the face image is used as information for identifying the driver of the vehicle 10, but the driver of the vehicle 10 may identify the face image based on other biometric information. Examples of such biological information include a fingerprint, a voice print, and an iris pattern.

Further, in the description of the embodiment, only the server device 200 is illustrated as the transmission destination of the sensor data, but there may be a plurality of transmission destinations of the sensor data. In this case, application data may be received from each of the plurality of external devices. The transmission destination of the sensor data may be a manufacturer of the vehicle 10 or a related business, or may be a third party that has concluded a data provision contract. Further, in the description of the embodiment, the consent for "transmitting the sensor data to the outside of the vehicle 10" is acquired, but the consent may be for "providing the sensor data to a predetermined business" or "using the sensor data by the business".

Further, in the description of the embodiment, the driver of the vehicle 10 is confirmed to consent, but the object of the confirmation may be a passenger, an owner of the vehicle 10, or the like.

Further, when the risks and benefits of providing the sensor data differ depending on the conditions for providing the data, the driver may be allowed to guide the contents of the risks and benefits for each condition and select the conditions under which the data provision contract is to be concluded.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc (CD)-read-only memory (ROM), digital versatile disc (DVD), Blu-ray disc, etc.), a ROM, a random access memory (RAM), an erasable programmable read only memory (EPROM), an electrically erasable programmable read only memory (EE-PROM), a magnetic card, a flash memory, an optical card, and any type of medium suitable for storing electronic commands.

What is claimed is:

1. An information processing device, comprising:
a control unit that executes
identifying a user associated with a first vehicle based on a face image of the user acquired by a camera,
determining whether a corresponding record of consent of the user associated with the first vehicle exists in a database,
based on a negative determination that the corresponding record of consent does not exist, acquiring information regarding a risk involved when providing first data that is data acquired by the first vehicle while traveling, to a first business,
presenting information regarding the risk to the user associated with the first vehicle,
presenting data related to a proportion of users consenting to providing the first data, as to all users,
querying the user whether the user consents to providing the first data to the first business, and
based upon receiving an affirmative determination that the user consents, causing the first data to be transmitted to the first business.

2. The information processing device according to claim 1, wherein:
the first data is data of a plurality of types; and
the control unit acquires and presents information related to the risk for each type of the first data.

3. The information processing device according to claim 1, wherein the information related to the risk includes information related to an entity that uses the first data.

4. The information processing device according to claim 1, wherein the control unit further presents an acquisition condition for acquiring the first data by the first vehicle.

* * * * *